United States Patent
Muszynski

(10) Patent No.: US 6,858,960 B1
(45) Date of Patent: Feb. 22, 2005

(54) LOW COGGING PERMANENT MAGNET MOTOR

(75) Inventor: Jerzy Muszynski, Rochester Hills, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/245,215

(22) Filed: Sep. 17, 2002

(51) Int. Cl.[7] .............................................. H02K 21/12
(52) U.S. Cl. ........................... 310/156.47; 310/156.38; 310/156.44; 310/156.46
(58) Field of Search ...................... 310/156.01, 156.32, 310/156.38, 156.43, 156.44, 156.45, 156.46, 156.47, 156.48

(56) References Cited

U.S. PATENT DOCUMENTS

| | | | |
|---|---|---|---|
| 3,860,843 A | 1/1975 | Kawasaki et al. ............ 310/67 |
| 4,341,969 A | 7/1982 | Sievert ........................ 310/157 |
| 4,424,463 A | 1/1984 | Musil ......................... 310/49 R |
| 4,692,645 A | 9/1987 | Gotou ......................... 310/184 |
| 4,692,646 A | 9/1987 | Gotou ......................... 310/184 |
| 4,714,852 A | * 12/1987 | Kawada et al. ........ 310/156.38 |
| 5,162,685 A | * 11/1992 | Yamaguchi et al. ... 310/156.28 |
| 5,220,228 A | * 6/1993 | Sibata ........................ 310/254 |
| 5,250,867 A | 10/1993 | Gizaw ........................ 310/179 |
| 5,783,890 A | 7/1998 | Mulgrave .................... 310/156 |
| 5,936,322 A | 8/1999 | Yamaguchi et al. ........ 310/156 |
| 6,034,459 A | 3/2000 | Matsunobu et al. ........ 310/156 |
| 6,104,117 A | * 8/2000 | Nakamura et al. .......... 310/254 |
| 6,104,459 A | 8/2000 | Oike et al. .................. 310/156 |
| 6,140,728 A | * 10/2000 | Tomita et al. ......... 310/156.12 |
| 6,204,584 B1 | 3/2001 | Muszynski .................. 310/156 |
| 6,239,525 B1 | 5/2001 | Matsunobu et al. |
| 2002/0067092 A1 | * 6/2002 | Crapo et al. ........... 310/156.47 |

* cited by examiner

*Primary Examiner*—Burton S. Mullins
*Assistant Examiner*—Leda Pham
(74) *Attorney, Agent, or Firm*—Dykema Gossett PLLC

(57) ABSTRACT

The present invention minimizes variations in torque due to cogging in a permanent magnet brushless electric motor and, among other things, specifies a topology of a rotor and a stator in relation to one another. According to one embodiment, a permanent magnetic motor includes a housing surrounding a stator that in turn surrounds a rotor rotatably mounted to the housing. The stator has a stator cross section including a plurality of uniformly distributed and spaced apart stator poles separated by slots. The stator poles extend radially inward from the inner surface and terminate at an end defined by an inner pole face. Each end is separated from an adjacent end by a distance defined as a stator slot width W. The rotor cross section includes a plurality of spaced apart permanent magnets carried by the shaft and angularly and uniformly distributed about the shaft. The outer most point of the magnet, measured from the axis of rotation, is separated radially from the inner pole faces by a distance defined as a minimum magnetic air gap. According to one aspect of the present invention, a low cogging effect is achieved when the configuration includes a defined ratio of the stator slot width W to air gap G. To achieve this, the defined ratio of the stator slot width W to air gap G is preferably about equal to or lower than 1.66. That is, the ratio of (stator slot width W)/(air gap G) is about equal to or lower than 1.66.

15 Claims, 3 Drawing Sheets

(Stator Slot Width W) / (Air Gap G)   322

$E \geq .22\,(2 \times R2)$   OR   $\dfrac{E}{2 \times R2} \geq .22$

FIG. 5

LOW COGGING PERMANENT MAGNET MOTOR

BACKGROUND OF THE INVENTION

1. Field of Invention

This invention relates to permanent magnet motors, in particular, to a motor topology that reduces the effects of cogging.

2. Disclosure of Related Art

Permanent magnet motors typically have one or more pairs of diametrically opposed permanent magnet poles affixed to a rotor defining rotor poles. The rotor is typically mounted about an axis for rotation within a stator. The stator has a series of diametrically opposed stator poles angularly distributed around the rotor to oppose the rotor poles across an air gap. Windings or coils are typically wound around the stator with at least some windings being within the magnetic field of the permanent magnetic poles affixed to the rotor. The windings are configured about the stator poles to form phase coils. When the phase coils are energized by generating current through the windings, a magnetic flux is established about the stator creating repelling and attracting forces between the stator and the rotor. These forces act as a torque to attract a pair of rotor poles to rotate into alignment with the stator poles. The current in the phase coils is generated in a predetermined sequence to produce a torque on the rotor to cause the rotor to turn or stop. The reluctance of the motor air gap is significantly higher at the stator slots than at the stator poles. As the permanent magnet poles rotate across the stator poles and slots, the magnetic forces between the rotor and stator vary. This effect is known as cogging.

As a result of cogging, the rotor tends to assume a discrete number of angular positions relative to the stator when the motor stops. When the desired rotational stopping position is not at a point of polar alignment, a motor subject to cogging effects may be inadequate or less desirable. Further cogging can cause difficulties in starting the motor. When the motor stops, the rotor will snap to a fixed angle relative to the stator and hold that angle until the torque exceeds the holding torque of the motor at which point the rotor will turn trying to hold at each successive equilibrium point. Instead of providing a constant torque throughout each rotation of the motor, cogging causes the torque to vary in a sinusoidal or other periodic manner. This can be particularly disadvantageous when smooth operation is important.

Generally, the number of poles and the structural configuration of the motor can affect the amount of cogging. A structural configuration with a larger air gap between the rotor and stator can reduce magnetic flux density. A reduction in magnetic flux density can reduce cogging torque, but that results in a reduction in torque of the permanent magnet motor. In a typical permanent magnet rotor, a single piece cylindrical magnet is mounted on a cylindrical shaft and charged to include at least one pair of poles having opposite polarity. This configuration, while economical to produce, suffers from high cogging torque. A variety of attempts have been made to reduce permanent magnet motor cogging effects. One method in U.S. Pat. No. 4,424,463 appears to include skewing the stator winding slots with respect to the permanent magnet pole edges. Another method involves skewing the permanent magnet pole pieces with respect to the stator winding slots. Cogging torque may also be reduced by providing a motor where the number of stator poles is less than the number of rotor permanent magnet poles as discussed in U.S. Pat. No. 3,860,843. These practices, however, complicate the manufacturing process, and increase manufacturing costs. In U.S. Pat. No. 4,341,969 the edges of the permanent magnet pole pieces are cut or machined to form a series of notches on the leading and trailing edges of the stator poles. In U.S. Pat. No. 5,783,890 the leading and trailing edges of the rotor permanent magnets are magnetized in a longitudinally to a periodic undulating magnetic field strength which varies from a first magnetic field strength to a lesser second magnetic field strength along the length of leading and trailing margins.

U.S. Pat. No. 6,204,584 B1, entitled Low Cogging Torque Brushless Motor Rotor, hereby incorporated by reference, utilizes a rotor shaft and a magnet with an airgap described between the rotor shaft and magnet. Machining of rotor shafts and selective magnetization can increase the cost of manufacturing. Further, permanent magnet motors are utilized under a variety of performance requirements, packaging requirements, and manufacturing constraints. As a result, there remains a continual need for improved permanent magnet motors which improve efficiency and reduce the effects of cogging.

The inventor of the present invention has discovered a new inventive apparatus for minimizing the effects of cogging in a permanent magnet motor. The present invention provides a high performance brushless motor that achieves low cogging torque not achievable by known methods.

SUMMARY OF THE INVENTION

The present invention minimizes variations in torque due to cogging in a permanent magnet brushless motor and, among other things, specifies a topology of a rotor and a stator in relation to one another. According to one embodiment, a permanent magnetic motor includes a housing surrounding a stator that in turn surrounds a rotor rotatably mounted to the housing. The embodiments described herein are directed to the topology of the stator and rotor assembly and are aimed at reducing the reluctance variation, thereby resulting in a reduction in cogging torque and its associated problems.

The stator has a stator cross section defining a substantially cylindrical inner surface and a plurality of uniformly distributed and spaced apart stator poles separated by slots. The stator poles extend radially inward from the inner surface and terminate at an end defined by an inner pole face. Each end is separated from an adjacent end by a distance defined as a stator slot width W.

The rotor has a longitudinally extending rotatable shaft radially inward of the stator inner cylindrical surface and defining a longitudinally extending axis of rotation. The rotor cross section includes a plurality of spaced apart permanent magnets carried by the shaft and angularly and uniformly distributed about the shaft. The outer most point of the magnet, measured from the axis of rotation, is separated radially from the inner pole faces by a distance defined as a minimum magnetic air gap. According to one aspect of the present invention a low cogging effect is achieved when the configuration includes a defined ratio of the stator slot width W to air gap G. To achieve this, the defined ratio of the stator slot width W to air gap G is preferably about equal to or lower than 1.66. That is the ratio of stator slot width W/air gap G is about equal to or lower than 1.66.

The permanent magnet motor according to the present invention exhibits reduced cogging effect. Other features and aspects of the present invention are provided with respect to the figures and detailed description of the various embodiments provided herein.

BRIEF DESCRIPTION OF THE DRAWINGS

FIG. 3 illustrates a representation of the "defined ratio" of stator slot width W to air gap G;

FIG. 4 illustrates a representation of the "effective de-center" value E; and

FIG. 5 illustrates a representation of the "effective de-center" value E.

DETAILED DESCRIPTION OF THE PREFERRED EMBODIMENT

The present invention minimizes variations in torque due to cogging in a permanent magnet brushless motor and, among other things, specifies a topology of a rotor and a stator in relation to one another. The embodiments described herein are directed to the topology of the stator and rotor assembly and are aimed at reducing the reluctance variation, thereby resulting in a reduction in cogging torque and its associated problems.

Figure 1:
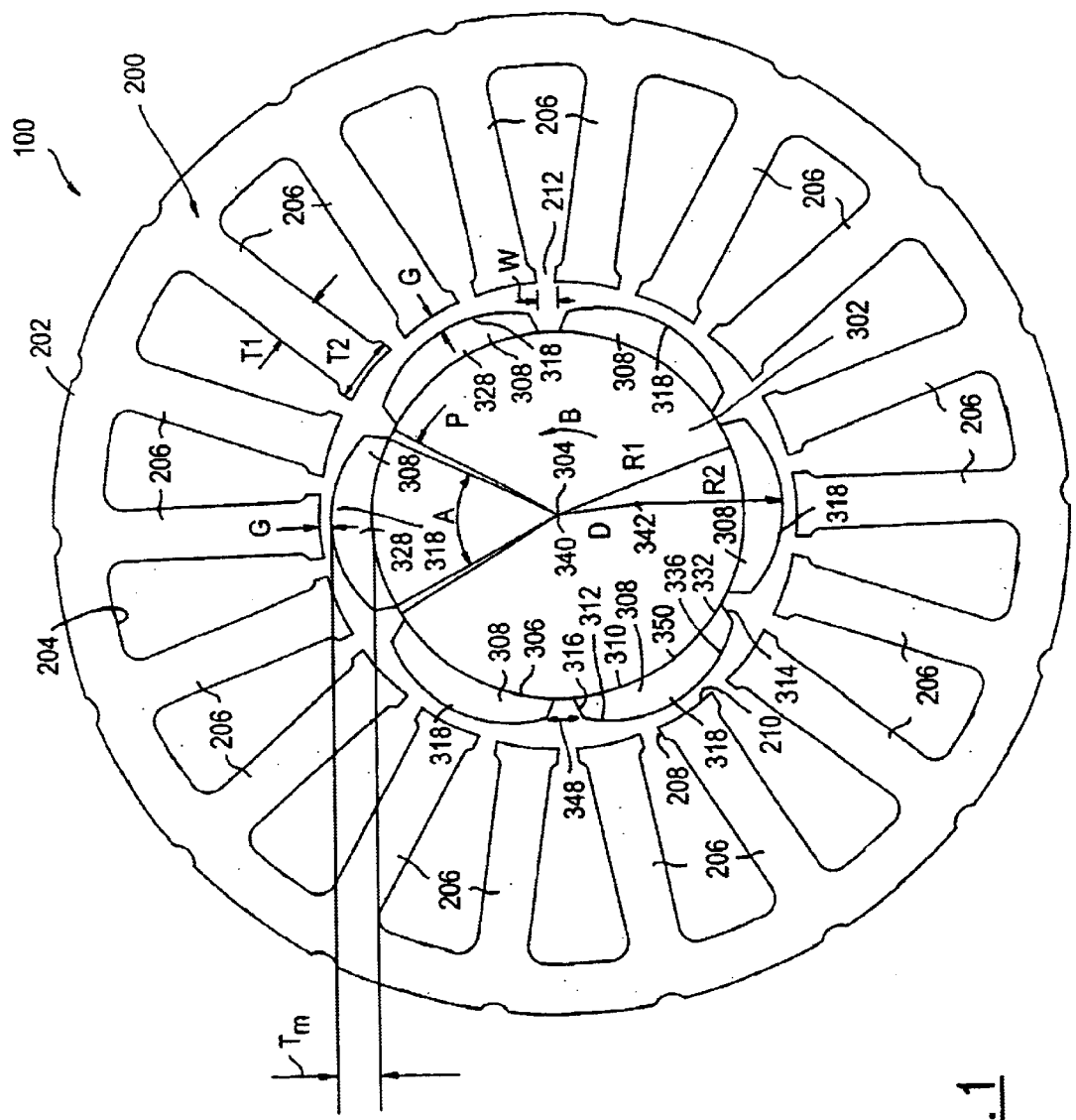
FIG. 1 is a cross-sectional view of an embodiment of a brushless, permanent magnet motor in accordance with the present invention, the stator windings are omitted for clarity.

Referring now to the drawings wherein like reference numerals are used to identify identical components in the various views. FIG. 1 illustrates an embodiment of a permanent magnetic motor 100 according to the present invention. The motor 100 includes a housing (not shown) surrounding a stator 200 that in turn surrounds a rotor 300 rotatably mounted to the housing.

The stator 200 has a stator cross section 202 defining a substantially cylindrical inner surface 204 and a plurality of uniformly distributed and spaced apart stator poles 206 separated by slots 212. The stator poles 206 extend radially inward from the magnet inner surface 310 and terminate at an end defined by an inner pole face 210. Each end is separated from an adjacent end by a distance defined as a stator slot width W.

Figure 2:
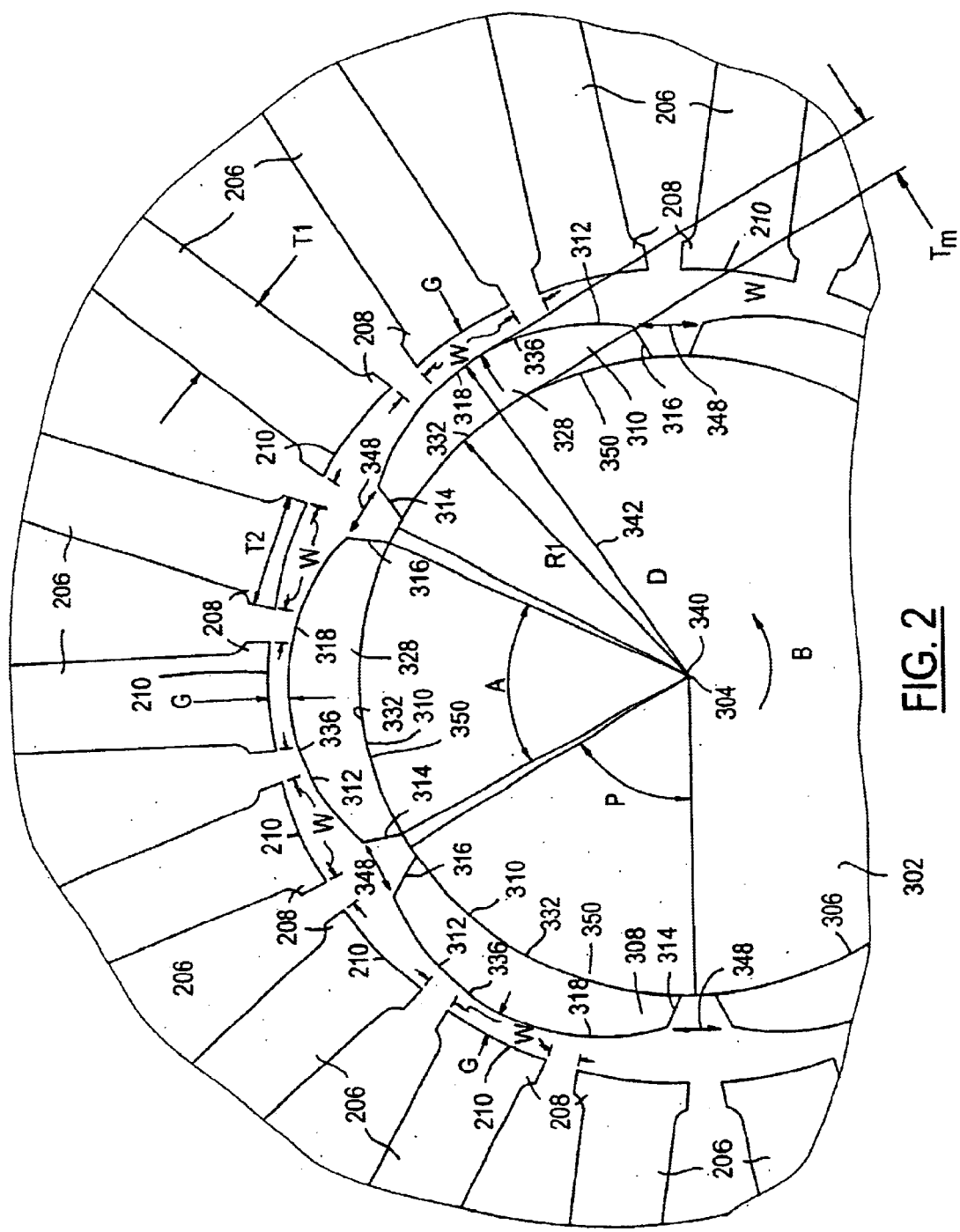
FIG. 2 is an enlarged cross-sectional view of an embodiment of a brushless, permanent magnet motor in accordance with the present invention.

The rotor 300 has a longitudinally extending rotatable shaft 302 radially inward of the stator 200 inner cylindrical surface and defining a longitudinally extending axis 304 of rotation. The rotor 300 cross section includes a plurality of spaced apart permanent magnets 308 carried by the shaft 302 and angularly and uniformly distributed about the shaft 302. With further reference to FIG. 1 and FIG. 2, with the permanent magnets and stator poles in the aligned state, the outer most point 318 of the permanent magnet 308, measured from the axis 304 of rotation, is separated radially from the inner pole faces 210 by a distance defined as a air gap G. With reference to FIG. 3, a low cogging effect is achieved when the configuration includes a defined ratio 322 of the stator slot width W to air gap G. To achieve this, the defined ratio 322 of the stator slot width W to an air gap G is preferably about equal to or lower than 1.66. That is, the ratio expressed by the equation (stator slot width W)/(air gap G), is about equal to or lower than 1.66.

Preferably, the permanent magnet 308 has a variable thickness with the maximum thickness Tm in the central portion 328 of the cross section and decreasing as the permanent magnet 308 extends along the circumference 306 of the shaft 302 until reaching a minimum thickness at the leading end 314 and trailing end 316 of the permanent magnet 308. According to one embodiment, the permanent magnet 308 further has an arced inner surface 332 defined by a first radius R1 and an arced outer surface 336 defined by a second radius R2, wherein the first radius R1 is greater than the second radius R2, thus achieving a maximum thickness Tm in the central portion 328 of the cross section while the thickness decreases until reaching the minimum thickness at the leading end 314 and trailing end 316. The motor 100 may further be defined by the "effective de-center" value E. With further reference to FIG. 3, the effective de-center value E is defined as the difference between the "de-center" distance D between the second radius origin 342 and the first radius origin 340, located on axis 304 as shown in FIG. 1 and FIG. 2, and the maximum thickness Tm of the permanent magnet 308. Thus the effective de-center value E is expressed as the equation E=D−Tm. With further reference to FIG. 4 and FIG. 5, the "effective de-center" value E is preferably at least about 22% of twice the value of the second radius R2. That is, the ratio of the effective de-center value E to twice the value of the second radius R2, the ratio being expressed by equation E/(2.0×R2), is preferably about equal to or greater than 0.22. The OD of the rotor 300 is measured from the outermost point 318 on a permanent magnet 308 to the outermost point 318 on a diametrically opposed permanent magnet 308. Each spaced apart permanent magnet 308, of the plurality of permanent magnets uniformly distributed about the shaft 302, has a magnet angle A defined to be about 96 percent of the pitch P, the magnet angle A being defined as the angle that subtends the interface 350 of the permanent magnet 308 with the shaft 302, and the pitch P being defined as three hundred sixty degrees divided by the number N of permanent magnets 308. According to one embodiment, the stator poles 206 further have a thickness T1 and T2 defined to allow a flux density less than or equal to about 95% of the saturation point.

According to one embodiment, the leading end 314 is comprised of a substantially straight leading surface and the trailing end 316 is comprised of substantially straight trailing surface, where the straight leading surface and straight trailing surface are defined between respective ends of the arced inner surface 332 and the arced outer surface 336. According to one embodiment, the trailing surface of one permanent magnet 308 and the adjacent leading surface of the adjacent permanent magnet 308 are separated by a separation distance 348 that increases as the trailing surface and adjacent leading surface extend from the arced inner surface 332 to the arced outer surface 336.

According to one embodiment, the rotor 300 cross section uniformly extends the longitudinal length of the rotor 300 to form a straight rotor 300. Further, the stator cross section 202 may uniformly extend the longitudinal length of the stator 200. The rotor 300 and stator 200 may be of substantially similar longitudinal lengths.

While the present invention has been described with reference to exemplary embodiments, a variety of embodiments may be produced utilizing the apparatus and process described herein. Modifications and variations in the invention will be apparent to those skilled in the art in light of the foregoing description. It is therefore contemplated that the appended claims and their equivalents will embrace any such alternatives, modifications and variations as falling within the scope of the present invention.

What is claimed is:

1. A permanent magnetic motor comprising:
    a stator having a cross section defining an inner cylindrical surface, a plurality of uniformly distributed and spaced apart stator poles that extend radially inward from the inner surface and terminate at an end defined by an inner pole face, each end separated from an adjacent end by a distance defined as a stator slot width W;

a rotor having a longitudinally extending rotatable shaft radially inward of the stator inner cylindrical surface and defining an axis of rotation, a cross section including a plurality of spaced apart permanent magnets carried by the shaft and angularly distributed about the shaft, the outer most point on the cross section of each permanent magnet is separated radially from the inner pole faces by a distance defined as a minimum magnetic air gap G;

a defined ratio of the stator slot width W to air gap G that is defined to be about equal to or lower than 1.66;

wherein each permanent magnet has an arced inner surface defined by a first radius R1 and an arced outer surface defined by a second radius R2 and an "effective de-center" value E is at least about 22% of twice the value of the second radius R2 where the effective de-center value E is defined as E=D−Tm, the difference between the "de-center" distance D, defined as the distance between the origin of the second radius R2 and the origin of the first radius R1, and the maximum thickness Tm of the permanent magnet; and the rotor cross section and stator cross section each uniformly extend the longitudinal length of the rotor and stator.

2. The motor of claim 1 wherein each permanent magnet has a maximum thickness in the central region of the cross section of the permanent magnet and decreases in thickness as the permanent magnet extends along the circumference of the shaft until reaching a minimum thickness at the leading and trailing ends of the permanent magnet.

3. The motor of claim 2 wherein the first radius is greater than the second radius.

4. The motor of claim 3 wherein the leading end of the permanent magnet is comprised of a substantially straight leading surface and the trailing end of the permanent magnet is comprised of a substantially straight trailing surface, the straight leading surface and straight trailing surface each defined between the arced inner surface and the arced outer surface.

5. The motor of claim 4 wherein the trailing surface of one permanent magnet and the adjacent leading surface of an adjacent magnet are separated by a distance that increases as the trailing surface and adjacent leading surface extend from the arced inner surface to the arced outer surface.

6. The motor of claim 1 wherein the spaced apart permanent magnets uniformly distributed about the shaft have a magnet angle A defined to be about 96 percent of the pitch, wherein the magnet angle subtends the interface of the permanent magnet with the shaft, and wherein the pitch is defined as 360 degrees divided by the number of N permanent magnets.

7. The motor of claim 1 wherein each stator pole cross section extends radially inward from the stator inner surface with a substantially T-shaped cross section with a first thickness T1 and a second thickness T2, the portion having the second thickness T2 terminating at the inner pole face, wherein T1 is less than T2.

8. A permanent magnetic motor comprising:

a stator having a cross section defining an inner cylindrical surface, a plurality of uniformly distributed and spaced apart stator poles that extend radially inward from the inner surface and terminate at an end defined by an inner pole face, each end separated from an adjacent end by a distance defined as a stator slot width W;

a rotor having a longitudinally extending rotatable shaft radially inward of the stator inner cylindrical surface and defining an axis of rotation, a cross section including a plurality of spaced apart permanent magnets carried by the shaft and angularly distributed about the shaft, the outer most point on the cross section of each permanent magnet is separated radially from the inner pole faces by a distance defined as a minimum magnetic air gap;

a defined ratio of the stator slot width W to air gap G defined to be about equal to or lower than 1.66; and wherein each permanent magnet has an arced inner surface defined by a first radius R1 and an arced outer surface defined by a second radius R2, wherein the first radius R1 is greater than the second radius R2 and an "effective de-center" value E is at least about 22% of twice the value of the second radius R2, where the "effective de-center" value E is defined as E=D−Tm, the difference between the "de-center" distance D, defined as the distance between the origin of the first radius R1 and the origin of the second radius R2, and the maximum thickness Tm.

9. The motor of claim 8 wherein the defined ratio of the stator slot width W to air gap G is defined to be about 1.66.

10. The motor of claim 8 wherein the defined ratio of the stator slot width W to air gap G is defined to be about 1.00.

11. The motor of claim 8 wherein the defined ratio of the stator slot width W to air gap G is defined to be about 0.5.

12. A rotor and stator assembly comprising:

a stator having a cross section defining an inner cylindrical surface, a plurality of uniformly distributed and spaced apart stator poles that extend radially inward from the inner surface and terminate at an end defined by an inner pole face, each end separated from an adjacent end by a distance defined as a stator slot width W;

a rotor having a longitudinally extending rotatable shaft radially inward of the stator inner cylindrical surface and defining an axis of rotation, a cross section including an uninterrupted circular periphery with a plurality of spaced apart permanent magnets carried by the shaft and angularly distributed about the shaft, the outer most point on the cross section of each permanent magnet is separated radially from the inner pole faces by a distance defined as a minimum magnetic air gap;

a defined ratio of the stator slot width W to air gap G that is defined to be about equal to or lower than 1.66; and wherein each permanent magnet has an arced inner surface defined by a first radius R1 and an arced outer surface defined by a second radius R2, the first radius R1 is greater than the second radius R2, and the rotor cross section and stator cross section uniformly extend the longitudinal length of the rotor and stator.

13. The motor of claim 12 wherein each permanent magnet has a maximum thickness in the central region of the cross section of the permanent magnet and decreases in thickness as the permanent magnet extends along the circumference of the shaft until reaching a minimum thickness at the leading and trailing ends of the permanent magnet.

14. The motor of claim 13 wherein an "effective de-center" value E is at least about 22% of twice the value of the second radius R2 where the effective de-center value E is defined as the difference between the "de-center" distance D between the origin of the second radius and the origin of the first radius and the maximum thickness Tm of the permanent magnet.

15. The motor of claim 14 wherein the spaced apart permanent magnets uniformly distributed about the shaft have a magnet angle A defined to be about 96 percent of the pitch, wherein the magnet angle subtends the interface of the permanent magnet with the shaft, and wherein the pitch is defined as 360 degrees divided by the number N of permanent magnets.

* * * * *